United States Patent
Han et al.

(10) Patent No.: US 9,826,499 B2
(45) Date of Patent: Nov. 21, 2017

(54) METHOD FOR TRANSMITTING DATA FROM COMMUNICATION DEVICE FOR PROVIDING VEHICLE INFOTAINMENT SERVICE AND SYSTEM USING THE SAME

(71) Applicant: Kyungpook National University Industry-Academic Cooperation Foundation, Daegu (KR)

(72) Inventors: Dong Seog Han, Daegu (KR); Eun Jeong Jang, Daegu (KR); Rinara Woo, Daegu (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 169 days.

(21) Appl. No.: 14/650,860

(22) PCT Filed: Dec. 6, 2013

(86) PCT No.: PCT/KR2013/011303
§ 371 (c)(1),
(2) Date: Jun. 9, 2015

(87) PCT Pub. No.: WO2014/092398
PCT Pub. Date: Jun. 19, 2014

(65) Prior Publication Data
US 2015/0312883 A1    Oct. 29, 2015

(30) Foreign Application Priority Data

Dec. 10, 2012 (KR) .......................... 10-2012-0143136

(51) Int. Cl.
*H04W 64/00* (2009.01)
*H04H 20/62* (2008.01)
(Continued)

(52) U.S. Cl.
CPC .......... *H04W 64/006* (2013.01); *H04H 20/62* (2013.01); *H04M 3/4878* (2013.01);
(Continued)

(58) Field of Classification Search
None
See application file for complete search history.

(56) References Cited

U.S. PATENT DOCUMENTS

2012/0093091 A1* 4/2012 Kang ...................... H04W 4/22
370/329

OTHER PUBLICATIONS

Wang et al., "Improving the Channel Utilization of IEEE 802.11p/1609 Networks", 2009, IEEE.*

(Continued)

*Primary Examiner* — Peter Chau
(74) *Attorney, Agent, or Firm* — Blakely Sokoloff Taylor & Zafman LLP (57) ABSTRACT

The present disclosure relates to a method of data transmission of On-Board Unit for vehicle infotainment service and system using thereof. More particularly, the present disclosure relates to a method of data transmission of a vehicular communication device and a system thereof to receive service advertisement message from other vehicular communication device when failing to receive a service advertisement message that is broadcasted from a Road-Side Unit.

6 Claims, 6 Drawing Sheets

(51) Int. Cl.

| | |
|---|---|
| *H04M 3/487* | (2006.01) |
| *H04W 28/02* | (2009.01) |
| *H04W 48/10* | (2009.01) |
| *H04W 76/00* | (2009.01) |
| H04W 40/24 | (2009.01) |
| H04W 84/00 | (2009.01) |
| H04W 88/00 | (2009.01) |

(52) U.S. Cl.
CPC ......... *H04W 28/021* (2013.01); *H04W 48/10* (2013.01); *H04W 76/002* (2013.01); *H04W 40/244* (2013.01); *H04W 84/005* (2013.01); *H04W 88/005* (2013.01)

(56) References Cited

OTHER PUBLICATIONS

Campolo et al., "On Vehicle-to-Roadside Communications in 802.11p/WAVE VANETs", 2011, IEEE WCNC, pp. 1010-1015.*

* cited by examiner

METHOD FOR TRANSMITTING DATA FROM COMMUNICATION DEVICE FOR PROVIDING VEHICLE INFOTAINMENT SERVICE AND SYSTEM USING THE SAME

TECHNICAL FIELD

The present disclosure relates to a method of data transmission of On-Board Unit for vehicle infotainment service and system using thereof. More particularly, the present disclosure relates to a method of data transmission of a vehicular communication device and a system thereof to receive service advertisement message from other vehicular communication device when failing to receive a service advertisement message that is broadcasted from a Road-Side Unit.

BACKGROUND

A vehicle developed into a vehicular communication system that not only is transportation but can also provide services such as real-time traffic information, digital map, movie and music through external internet. A Vehicular Ad-hoc Network (hereinafter, referred to as "VANET") technology including the aforementioned vehicular communication system should be suitable for fast speed and frequent mobility of a vehicle hence, network technology that is different from the related art of Mobile Ad-hoc Network (hereinafter, referred to as "MANET") is required.

IEEE WAVE (Wireless Access in Vehicular Environment) is a wireless communication standard to provide the above VANET service including IEEE 802.11p and IEEE 1609 standard. Additionally, the IEEE WAVE supports fast link connection between OBU (On-Board Unit) for a vehicle driving in a maximum speed of 160 km/h and RSU (Road-Side Unit) installed in road-sides and high speed data transmission of maximum 27 Mbps. Technology regarding IEEE WAVE standard have been developing mainly in the North American region and active commercialization and standardization is being promoted also in Europe, Japan and etc. Moreover, the Ministry of Land of the Republic of Korea is promoting IEEE WAVE standard technology as a candidate technology.

A service provider of the Road-Side Unit (hereinafter, referred to as "RSU") and etc. periodically transmits Wave Service Advertisement (hereinafter, referred to as "WSA") with network parameter such as WBSS recognizor, a service channel used by a WBSS, timing information for synchronization that is necessary to register for WBSS (Wave BSS) as a method to provide services through the IEEE 802.11p standard WAVE mode. Herein, the WSA message receiving vehicle communication device may receive related service using service channel information and etc. included in the WSA message thereof.

However, there is a problem that a vehicular communication device that did not receive the WSA message from the service provider of the RSU unit and etc. may have to wait to receive the WSA message until next transmission period to receive related services.

In the paper ┌ Augmenting Vehicle-to-Roadside connectivity in multi-channel vehicular Ad Hoc Networks ┘ by C. Campolo et el. suggests a method of receiving WSA message through other vehicular communication device. In the paper, when the vehicular communication device receives a WSA message, the WSA message broadcasts the piggybacked beacon message to proximate vehicular communication device, thereby suggesting that vehicular communication device that did not receive the WSA message can receive the WSA message through the message.

However, when the entire vehicular communication device that received the WSA message broadcasts the piggybacked beacon message as the method suggested in the paper, total capacity of the beacon message increases, thereby causing overload of the related channel. Additionally, QoS service through WAVE mode may be degraded due to the channel overload.

SUMMARY OF INVENTION

Solution to Problem

The present disclosure has been made in an effort to provide a method for data transmission of a vehicular communication method and system using thereof to collaboratively receive WSA message from proximate vehicular communication device and can prevent overload of the related channel at the same time.

Technical Solutions

The method for data transmission of a vehicular communication device according to an embodiment of the present disclosure includes (a) detecting service advertisement message reception; and (b) broadcasting beacon messages including information of reception detected through (a).

The service advertisement message may be a WSA (Wave Service Advertisement) message based on IEEE 802.11p and IEEE 1609 communication standard in an embodiment of the present disclosure.

Further, the beacon message may additionally include at least one information among identification information, location information and speed information.

Herein, (c) broadcasting a received service advertisement message after piggybacking to a beacon message when receiving the beacon message including not-received information of a service advertisement message, i.e. information that a vehicular communication device did not receive a service advertisement message.

The vehicular communication system according to an embodiment of the present invention, wherein the vehicular communication device providing vehicular infotainment service using a service advertisement message that is broadcasted by a RSU includes a receiver configured to receive a signal transmitted from the RSU or other vehicular communication device; a controller configured to detect reception of the service advertisement message through the receiver; and a transmitter configured to broadcast a beacon message including the reception information that is detected in the controller.

According to an embodiment of the present disclosure, the service advertisement message may be a WSA (Wave Service Advertisement) based on IEEE 802.11p and IEEE 1609 communication standard.

Further, the beacon message may additionally include at least one information among identification information, location information and speed information of a vehicular communication device.

Further, the controller detects reception of a beacon message including not-received information of a service advertisement message transmitted from other vehicular communication device through the receiver. When the controller detects reception, the controller may broadcast through the transmitter by piggybacking the received service advertisement message to the beacon message.

Effects of Invention

An embodiment of the present disclosure relates to a method for data transmission of a vehicular communication device and a system thereof to provide a vehicle infotainment service that broadcasts a beacon message including information regarding reception of a WSA message from service providers such as a Road-side Unit and etc. Further, when a beacon message that WSA message is not received is received, the received WSA message broadcasts the piggybacked beacon message to proximate vehicular communication device. Thereby, WSA message can be received not only from the RSU but also other vehicular communication device.

Further, when there is a vehicular communication device that did not receive the WSA message form the service providers such the RSU and etc., only the vehicular communication device that received the beacon message of the vehicular communication device transmits the piggybacked beacon message. Accordingly, overload of the related channel can be prevented.

METHOD FOR CARRYING OUT THE INVENTION

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

While the expressions such as "first" or "second" can be used to refer to various elements, the elements are not limited by the expressions. The expressions are used only for the purpose of distinguishing one element from the other.

The expressions are used herein only for the purpose of explaining specific embodiments and not to limit the present disclosure. An expression in singular form encompasses plural meaning, unless otherwise specified. Throughout the description, the expression "comprise" or "have" is used only to designate the existence of characteristic, number, step, operation, element, component or a combination thereof which are described herein, but not to preclude possibility of existence of one or more of the other characteristics, numbers, steps, operations, elements, components or combinations of these or addition.

Hereinafter, an embodiment of the present disclosure is described in detail referring to the attached drawings.

Figure 1:
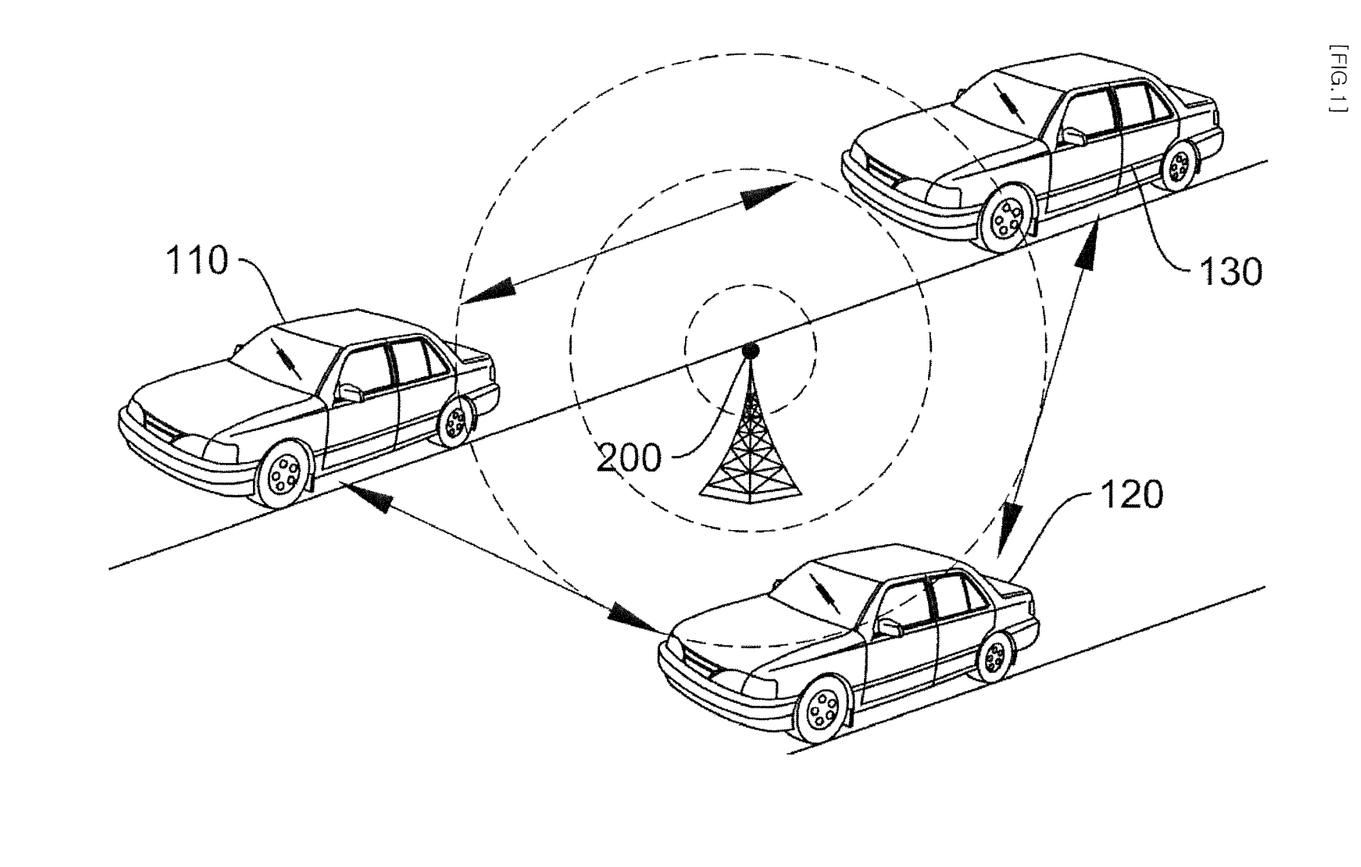
FIG. 1 is a diagram illustrating a Road-side unit and vehicular communication system for vehicular infotainment service according to an embodiment of the present disclosure.

FIG. 1 is a diagram illustrating a RSU and a vehicular communication device and system thereof for vehicle infotainment service according to an embodiment of the present disclosure.

As illustrated in FIG. 1, RSU 200 that is a service provider and at least one vehicular communication device (On-board Unit, OBU) that receives service are required for vehicular infotainment service. In an embodiment of the present disclosure, the RSU provides a service to at least one vehicular communication device based on a communication service (WAVE) of IEEE 802.11p. The communication network enables communication network between a RSU and a vehicular communication device network (Vehicle to Infrastructure, V2I) and network between vehicular communication devices (Vehicle to Vehicle, V2V). Thereby, the RSU communicates with a vehicular communication device located in the communication radius, hence communication between vehicular communication devices becomes possible.

The V2I may provide the a vehicular infotainment service such as traffic information, safety support and download service and etc. to a vehicle based on the RSU and the V2V network. For this, in an embodiment of the present invention, the RSU 200 may broadcast a Wave Service Advertisement (hereinafter, referred to as "WSA") including a network parameter such as a WBSS recognizer, a service channel used by the WBSS, timing information for synchronization to proximate vehicular communication devices 110, 120, 130 for WBSS registration.

Further, in an embodiment of the present invention, the vehicular communication devices 110, 120, 130 may broadcast a beacon message including information regarding reception of the WSA message from the RSU 200. For example, when a first vehicular communication device 110 receives a WSA message from the RSU 200, the first vehicular communication device 110 may broadcast the beacon message including information that WSA message is received to a second vehicular communication device 120 and a third vehicular communication device 130.

On the other hand, when the second vehicular communication device 120 did not receive the WSA message form the RSU 200, the second vehicular communication device 120 may broadcast the beacon message including information that WSA message is received to a third vehicular communication device 130 and the first vehicular communication device 110 and etc.

Herein, if the third vehicular communication device 130 that received the WSA message received a beacon message transmitted from the first vehicular communication device 110, the third vehicular communication device also broadcasts a beacon message including information that WSA message is received to the first vehicular communication device 110. The transmission method may be unicast or broadcast methods.

However, when the third vehicular communication device 130 receives a beacon message from the second vehicular communication device 120, the third vehicular communication device 130 transmits a beacon message including information that WSA message is received, piggybacking the WSA message thereto. The transmission method may include unicast or broadcast.

Through the afore-mentioned method, the second vehicular communication device 120 may receive related services by receiving the WSA message from the third vehicular communication device 130. Hereinafter, referring to FIG. 2 to FIG. 6 illustrates in detail relating to a method for data transmission of a vehicular communication device and the system thereof.

Figure 2:
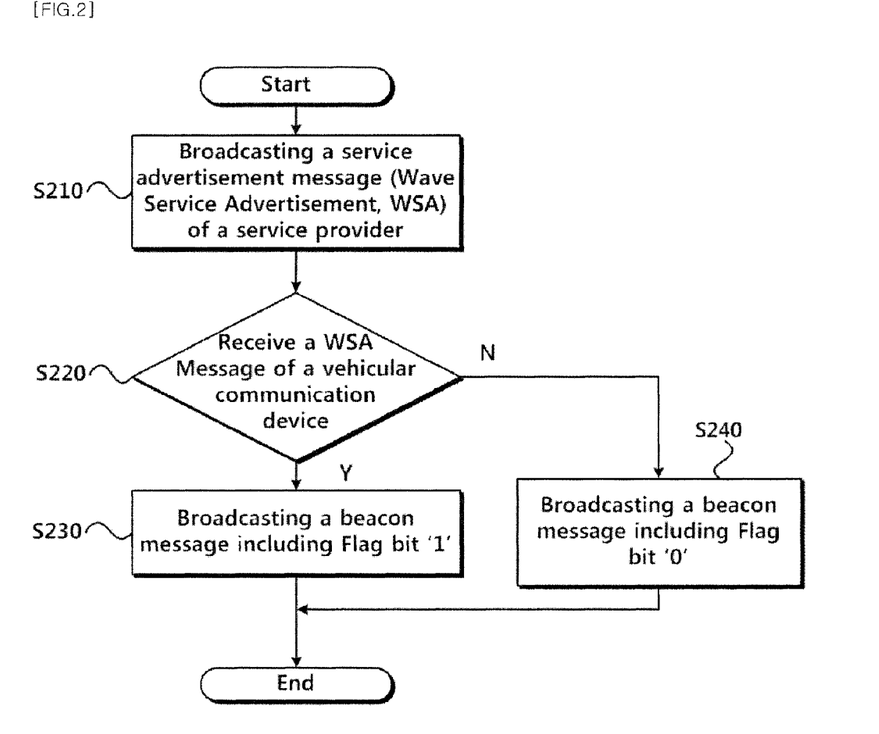
FIG. 2 is a diagram illustrating a method of data transmission of a vehicular communication device according to an embodiment of the present disclosure.

FIG. 2 is a diagram illustrating a method of data transmission of a vehicular communication device according to an embodiment of the present disclosure.

As illustrated in FIG. 2, in an embodiment of the present disclosure relates to a method for data transmission of a vehicular communication device including (a) detecting reception of a service advertisement message; and broadcasting a beacon message including reception information detected through the (b) and (a).

S210 a service provider broadcasts the service advertisement message to a proximate vehicular communication device for vehicle infotainment service. Herein, the service provider may include a service base station such as the RSU, located on the road. The service provider transmits the service advertisement message to the vehicular communication device may provide a network environment that vehicular communication device that received the service advertisement message to receive related services.

According to an embodiment of the present disclosure, the service advertisement message may include a message based on IEEE 802.11p and IEEE 1609 communication standard.

The IEEE802.11p standard discloses regarding the WAVE mode that may exchange data with any BSSID (BSS Identifier) without registration process of a BSS (Basic Service Set) considering that communication available time with certain service provider relatively shortens due to driving speed of a vehicle. More particularly, in the WAVE mode, registration and certification process of the IEEE 802.11 was all omitted. Accordingly, receiving a beacon of a WBSS enables for a wireless terminal to register for a WBSS (Wave BSS). In other words, the IEEE 802.11p receives WSA that is the beacon of WBSS, thereby can receive related services. The WSA message herein may include the network parameter such as the WBSS recognizer, the service channel used by the WBSS and the timing information for synchronization and etc. for the registration for WBSS yet the present disclosure does not limit to the afore-mentioned.

S220 the vehicular communication device detects reception of the service advertisement message from the service provider. The vehicular communication device may detect reception of WSA message from the vehicular communication device according to an embodiment of the present disclosure.

S230 when reception of the service advertisement message through the S220 is detected, the vehicular communication device broadcasts a beacon message including information that the service advertisement message is received. According to an embodiment of the present disclosure, when the vehicular communication device receives the WSA message from the RSU, the vehicular communication device can broadcast a beacon message including information that the WSA message is received.

Figure 3:
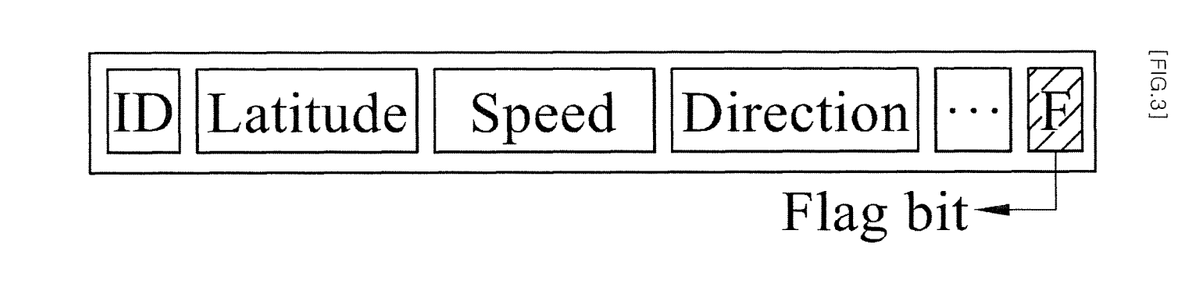
FIG. 3 is a diagram illustrating beacon frame according to an embodiment of the present disclosure.

Herein, the beacon message is a message including current status information regarding a vehicular communication device and transmit/receive between vehicular communication devices. The beacon message according to an embodiment of the present disclosure, the beacon message may additionally include at least one information among identification information of a vehicular communication device, location information and speed information. FIG. 3 illustrates related to the beacon message.

FIG. 3 is a diagram illustrating beacon frame according to an embodiment of the present disclosure.

As illustrated in FIG. 3, the beacon message wherein a vehicular communication device broadcasts may include identification information, location information, speed and direction information and etc. of the vehicular communication device. However, FIG. 3 displays representative information among information included in a beacon frame wherein the beacon message may additionally include other information that display status info, nation of the vehicular communication device.

Further, the beacon message includes information regarding reception of the service advertisement message from the service provider. According to an embodiment of the present disclosure, the beacon message may include the information regarding whether the WSA message is received from the RSU. Herein, the information of whether the WSA message is received may be displayed in Flag bit. For example, '1' represents when WSA message is received and '0' represents when WSA message is not received. However, this is an embodiment hence, the present disclosure is not limited to the embodiment.

According to an embodiment of the present disclosure, the WSA message is received in S230, thereby the vehicular communication device may broadcast the beacon message including Flag bit '1' displaying that the vehicular communication device received the WSA message.

Contrariwise, S240 when detected that service advertisement message is not received through S220, the vehicular communication device may broadcast a beacon message including information that the service advertisement message is not received. According to an embodiment of the present disclosure, when the vehicular communication device did not receive a WSA message from a RSU, the vehicular communication device may broadcast a beacon message including information that the WSA message is not received. Herein, the vehicular communication device may broadcasts a beacon message including Flag bit '0' representing that a WSA message is not received.

Figure 4:
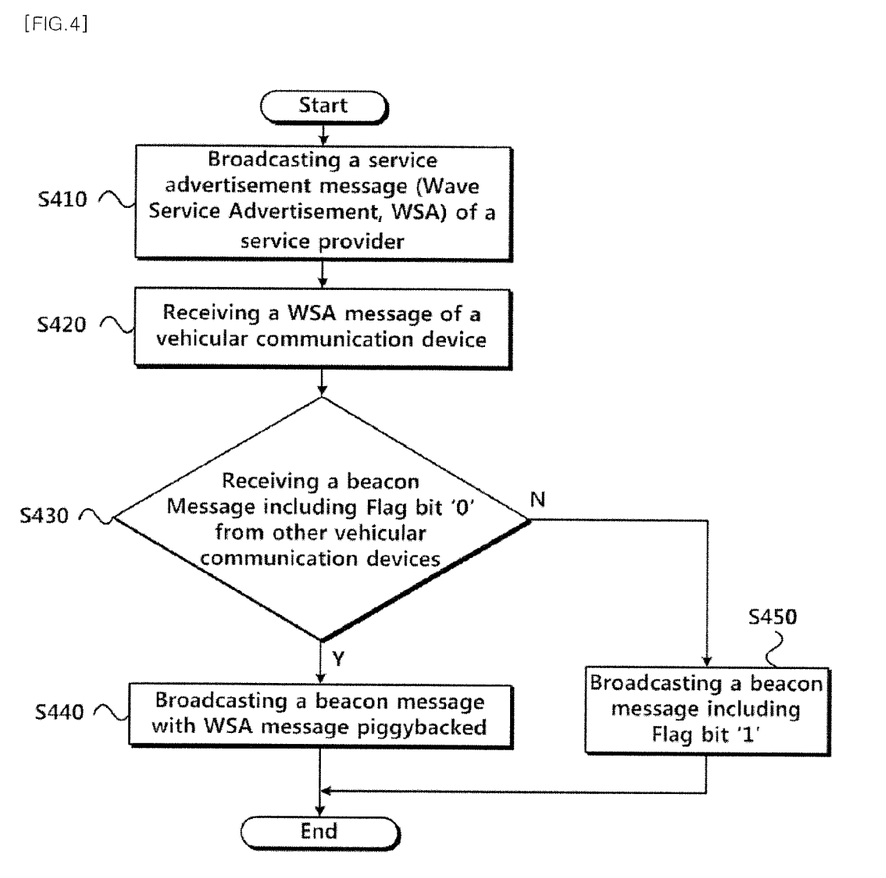
FIG. 4 is a diagram illustrating a method for data transmission of a vehicular communication device according to an embodiment of the present disclosure.

FIG. 4 is a diagram illustrating a method for data transmission of a vehicular communication device according to an embodiment of the present disclosure.

As illustrated in FIG. 4, S410 the service provider broadcasts a service advertisement message to provide vehicle infotainment service to a proximate vehicle communication device. According to an embodiment of the present disclosure, the service provider may include a RSU located on a road and the service advertisement message may include a WSA message based on the IEEE 802.11p communication standard. The S210 illustrates the afore-mentioned in detail hence, omitted hereinafter.

S420 a vehicular communication device receives a service advertisement message through the S410. According to an embodiment of the present disclosure, the vehicular communication device may receive the WSA message through the S410.

Hereinafter, S430 the vehicular communication device determines whether a beacon message including not-received information of a service advertisement message, is received from other vehicular communication device. The vehicular communication device according to an embodiment of the present disclosure can determine whether a beacon message including Flag bit '0' representing that a WSA message is not received from other vehicular communication devices.

S440 when determined that a beacon message including not-received information of a service advertisement message from other vehicular communication device through the S430, the vehicular communication device broadcasts the received service advertisement message, piggybacking on the beacon message. According to an embodiment of the present disclosure, when receiving a beacon message including Flag bit '0' indicating that a WSA message is not received from other vehicular communication devices, the vehicular communication device can broadcast the beacon message piggybacking the WSA message. Hereinafter, refer to FIG. 5 for more particulars.

Figure 5:
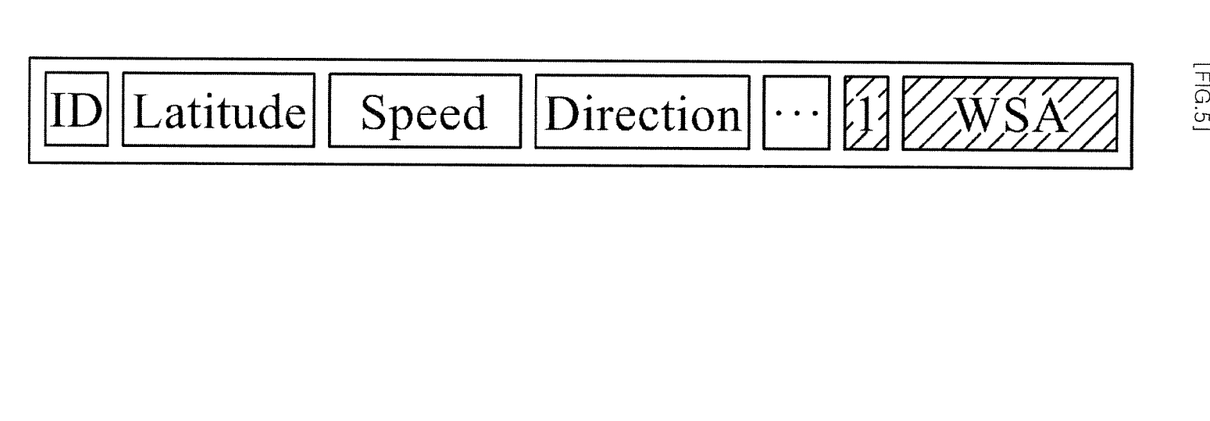
FIG. 5 is a diagram illustrating a beacon frame wherein a WSA message is piggybacked according to an embodiment of the present disclosure.

FIG. 5 is a diagram illustrating a beacon frame wherein a WSA message is piggybacked according to an embodiment of the present disclosure.

According to an embodiment of the present disclosure, the vehicular communication device may broadcast a beacon message with WSA message piggybacked that is a data format illustrated in FIG. 5. More particularly, the vehicular communication device may broadcast the beacon message piggybacking the WSA message including Flag bit '1' indicating that the WSA message is receiving.

Further, S450 when determining that a beacon message including not-received information of a service advertisement message from other vehicular communication devices is not received, the vehicular communication device can broadcast the beacon message including information of whether the service advertisement message is received. According to an embodiment of the present disclosure, when a beacon message including Flag bit'O' indicating that a WSA message is not received from other vehicular communication devices is not received, the vehicular communication device can only broadcast a beacon message including Flag bit '1' indicating that the vehicular communication devices received a WSA message that is not piggybacked. FIG. 3 illustrates in detail regarding the afore-mentioned hence, omitted hereinafter.

Figure 6:
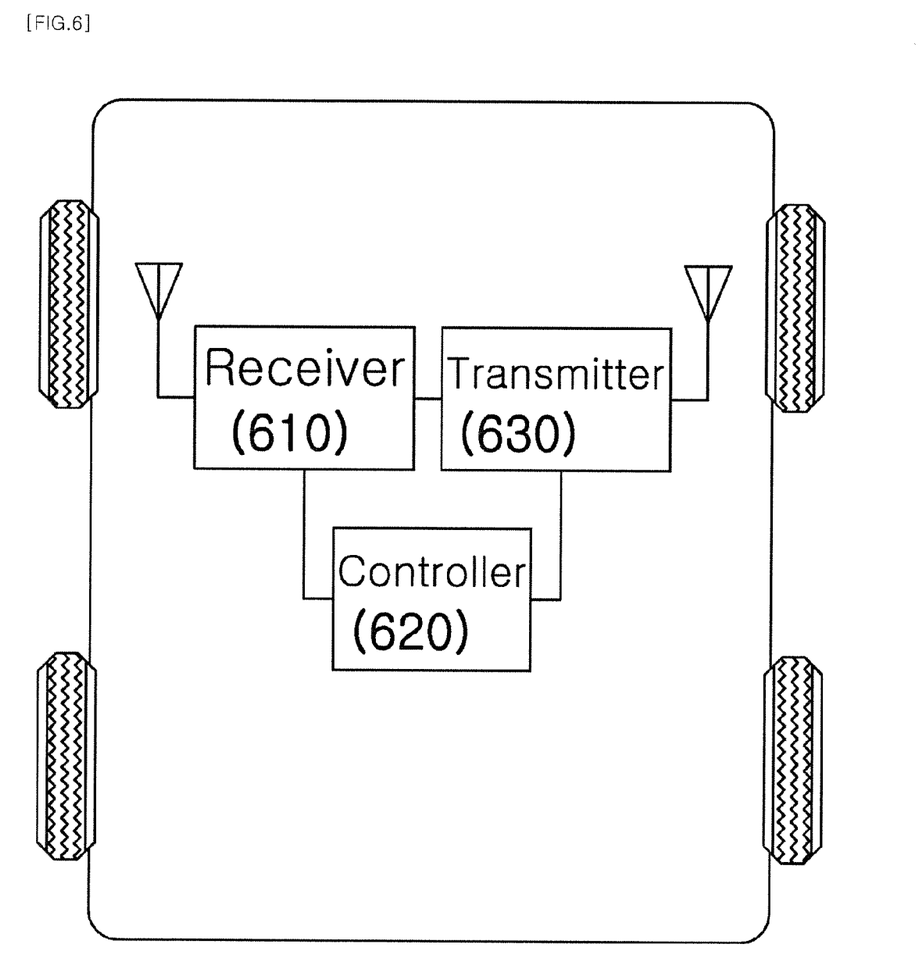
FIG. 6 is a diagram illustrating a vehicular communication device and system according to an embodiment of the present disclosure.

FIG. 6 is a diagram illustrating a vehicular communication device and system according to an embodiment of the present disclosure.

As illustrated in FIG. 6, the vehicular communication device and system according to an embodiment of the present invention relates to a vehicular communication device providing a vehicle infotainment service using a RSU broadcasting service advertisement message. The vehicular communication device includes a receiver 610 receiving a signal transmitted from a RSU or other vehicle communication device; a controller 620 detecting reception of a service advertisement message through the receiver 610; and a transmitter 630 broadcasting a beacon message including reception detected in the controller 620.

The receiver 610 receives a signal transmitted from a RSU or other vehicle communication device. The receiver 610 may receive a broadcasting service advertisement message and a beacon message transmitted from other vehicle communication devices. According to an embodiment of the present disclosure, the receiver may receive a WSA message, a beacon message including Flag bit indicating information of reception of the WSA message, and a beacon message that piggybacked the WSA message. Regarding the service advertisement message and the beacon message is illustrated in detail in the afore-mentioned, hence hereinafter omitted of illustration thereof.

The controller 620 detects reception of a service advertisement message through the receiver 610. According to an embodiment of the present disclosure, the controller 620 may detect whether a WSA message of IEEE 802.11p standard is received.

Herein, when the WSA message is received, the controller 620 controls the transmitter 630 to broadcast a beacon message including Flag bit '1' indicating that the WSA message is received. Contrariwise, when the WSA message is not received, the controller 620 controls the transmitter 630 to broadcast a beacon message including a Flag bit '0' indicating that the WSA message is received. Illustration regarding the afore-mentioned is in detail referring to FIG. 3 hence, omitted hereinafter.

Further, the controller 620 may detect reception of the beacon message including not-received information of the service advertisement message from other vehicular communication devices through the receiver 610. According to an embodiment of the present disclosure, the controller 620 may detect reception of the beacon message including the Flag bit '0' from other vehicular communication devices.

Herein, when receiving the beacon message including the not-received information of the service advertisement message from other vehicular communication devices, the controller 620 may control the transmitter 630 to broadcast the beacon message piggybacking the service advertisement message. According to an embodiment of the present disclosure, when receiving the beacon message including the Flag bit '0' from other vehicular communication devices, the controller 620 may control the transmitter 630 to broadcast the beacon message piggybacking the WSA message The transmitter 630 broadcasts the beacon message including reception information detected in the controller 620. According to an embodiment of the present disclosure, the transmitter 630 may broadcast a beacon message including Flag bit '1' when the WSA message is not received and Flag bit '0' when the WSA message is received. FIG. 3 illustrates in detail regarding the afore-mentioned, hence omitted hereinafter.

Further, the transmitter 630 may broadcast the beacon message piggybacking the received service advertisement message. According to an embodiment of the present disclosure, the transmitter 630 may broadcast the beacon message piggybacking the WSA message. FIG. 4 and FIG. 5 illustrate in detail regarding the afore-mentioned, hence omitted hereinafter.

The vehicular communication device may receive related services by receiving the service advertisement message from other vehicular communication device when the vehicular communication device did not receive the broadcasted service advertisement message from the RSU. According to an embodiment of the present disclosure, the vehicular communication device may receive related service by the WSA message of IEEE 802.11p standard from the RSU or other vehicular communication devices.

The preferred embodiments of the invention have been explained so far. a person skilled in the art will understand that the invention may be implemented in modifications without departing from the basic characteristics of the invention. Accordingly, the foregoing exemplary embodiments and advantages are merely exemplary and are not to be construed as limiting the present disclosure. The present teaching can be readily applied to other types of apparatuses. Also, the description of the exemplary embodiments of the present inventive concept is intended to be illustrative, and not to limit the scope of the claims.

What is claimed is:

1. A method for data transmission of a vehicular communication device, wherein the method for data transmission of the vehicular communication device providing vehicle infotainment service using a service advertisement message broadcasted by a Road-Side Unit (RSU), comprising:
(a) detecting reception of the service advertisement message;
(b) determining whether or not a beacon message including non-receipt information of a service advertisement message is received from another vehicle communication device; and
(c) after said determining determines that said beacon message is received, broadcasting the beacon message piggybacking the service advertisement message detected through said detecting.

2. The method for data transmission of the vehicular communication device of claim 1, wherein the service advertisement message detected is a WSA (Wave Service Advertisement) message based on IEEE 802.11p and IEEE 1609 communication standard.

3. The method for data transmission of the vehicular communication device of claim 1, wherein the beacon message additionally includes at least one information among identification information, location information and speed information.

4. A vehicular communication device, wherein the vehicular communication device providing vehicle infotainment service using a service advertisement message broadcasted by a Road-Side Unit (RSU), comprising:
a receiver configured to receive a signal transmitted from the RSU or other vehicular communication device;
a controller configured to detect reception of the service advertisement message through the receiver;
and a transmitter configured to broadcast a beacon message including a reception information that is detected in the controller,
wherein the controller detects reception of a beacon message including not-received information of a service advertisement message transmitted from other vehicular communication device through the receiver and, when the controller detects reception of the beacon message including the not-received information, the controller broadcasts the received beacon message piggybacking the received service advertisement message through the transmitter.

5. The vehicular communication device of claim 4, wherein the received service advertisement message is a WSA (Wave Service Advertisement) based on IEEE 802.11p and IEEE 1609 communication standard.

6. The vehicular communication device of claim 4, wherein the received beacon message additionally includes at least one information among identification information, location information and speed information of a vehicular communication device.

* * * * *